United States Patent [19]

Itoh et al.

[11] Patent Number: 5,696,518
[45] Date of Patent: Dec. 9, 1997

[54] ANTENNA DEVICE INTEGRALLY FIXED TO PORTABLE ELECTRONIC APPLIANCE

[75] Inventors: Yukio Itoh; Tadashi Yasuoka; Ryoji Amemiya, all of Tanashi, Japan

[73] Assignee: Citizen Watch Co., Ltd., Tokyo, Japan

[21] Appl. No.: 549,700

[22] PCT Filed: Jul. 25, 1994

[86] PCT No.: PCT/JP94/01219

§ 371 Date: Nov. 15, 1995

§ 102(e) Date: Nov. 15, 1995

[87] PCT Pub. No.: WO95/27928

PCT Pub. Date: Oct. 19, 1995

[30] Foreign Application Priority Data

Apr. 8, 1994 [JP] Japan ................... 6-070300

[51] Int. Cl.[6] ........................................... H01Q 1/12
[52] U.S. Cl. ........................................... 343/718; 343/788
[58] Field of Search ........................... 343/718, 787, 343/788, 872, 895; 455/351, 292, 274, 293, 344; H01Q 1/12

[56] References Cited

U.S. PATENT DOCUMENTS 3,983,483  9/1976  Pando ................................. 343/718
5,072,231  12/1991 Koyama ............................. 343/718

*Primary Examiner*—Hoanganh T. Le
*Attorney, Agent, or Firm*—Kanesaka & Takeuchi

[57] ABSTRACT

An antenna device used for portable electronic appliances such as electronic wristwatches furnished with a reception function. Antenna device 100 is bent conforming to the side of watch case 201 and installed on the side of watch case 201. The antenna device is composed of an antenna 110 and an antenna case 150 in which the antenna 110 is housed. The antenna case is made of or coated with a non-metallic material and formed separately from a watch case made of a metallic material. In addition, the antenna case is fixed to watch case 201 with screws 152 at positions apart from the extended line P of antenna core 111.

14 Claims, 9 Drawing Sheets

ANTENNA DEVICE INTEGRALLY FIXED TO PORTABLE ELECTRONIC APPLIANCE

BACKGROUND OF THE INVENTION

1. Field of the Invention

The present invention relates to an antenna device used for portable electronic appliances furnished with a reception function, and, in particular, to such an antenna device suitable for being installed in an electronic wristwatch.

2. Description of the Related Art

In recent years there has been a remarkable growth in portable electronic appliances utilizing radio waves, and these have been commercialized in many fields. The field of wristwatches has been no exception, and, a wide variety of such appliances utilizing radio waves have been commercialized, including radio wave watches which automatically adjust the time to the standard time by receiving time signals from the standard wave, radio-equipped wristwatches, and the like. However, in order to utilize radio signals, it is necessary not only to provide parts which are quite different from conventional timepiece parts, but also to give adequate consideration to the interference by which the reception performance is affected.

Among these parts, particularly antenna, which has a significant effects on the radio signal reception performance, is considerably large in size as compared with the parts of conventional wristwatches. There are also restrictions imposed on the locations where the antenna is placed in relation to the reception performance. Because of these reasons, various types of antennas, such as built-in type, expansion type, and cord type are employed.

A bar-antenna comprising a core and winding is chiefly used as the built-in type antenna. It is necessary for the antenna to be enclosed in a wristwatch with no reduction in its reception performance due to the effects of the material of construction and the structure of the casing of the appliances. In the cases of expansion type antenna used for radio-cassettes or the like, and a cord type antenna which is used as an earphone or the like as well, their retractability and durability must be taken into account.

In order to pursue further miniaturization and portability of these electronic appliances under this situation, not only avoiding reduction in the reception performance of the antenna is imperative, but also sufficient consideration must be given to their portability as well as to their design.

Conventional antenna constructions are then discussed taking particularly those used for a wristwatch as an example among various portable electronic appliances.

Conventionally, a wristwatch that has a metallic antenna arranged in the leather band has been known as a construction for installing an antenna in a wristwatch (Japanese Utility Model Laid-open (kokai) No. 126408/1990).

A wristwatch with unique design was disclosed in Japanese Utility Model Laid-open (kokai) No. 81787/1993 by the present inventors, in which an antenna consisting of a core and a coil wound around the core is placed between dial and windshield so as to separate the antenna from the metallic casing which interferes with the radio wave.

Further, another design is found in European Patent Publication No. 0382130, in which an antenna, for example, of a ring form is provided on the upper surface of the casing.

However, in the construction of the prior art wherein the antenna is provided in the band, it is impossible to provide a sufficient flexibility to the joining section of the antenna and the electronic watch module, because the antenna enclosed in the band must have condution to the electronic watch module in the casing. Furthermore, special bands such as rubber bands must be provided, because metallic bands interfere with radio waves. This imposes restrictions on the materials of construction and the design.

On the other hand, the construction with an antenna installed on the upper surface of the casing requires the antenna to be separated from the metallic parts of the watch module. This increases the thickness of a watch as a whole and imposes restrictions on the design. Thus, it has problems still to be improved.

In the construction arranging a ring-form antenna on the upper surface of casing, disclosed in European Patent Publication No. 0382130, the antenna must be installed separately from the watch module, because radio waves cannot be received by the antenna if any metallic substance is present inside the ring.

Accordingly, an object of the present invention is to provide an antenna device which is free from these drawbacks possessed by conventional antenna devices used in portable electronic appliances, i.e. an antenna device exhibiting excellent reception performance without imposing any restrictions on its design.

Another object of the present invention is to provide an antenna device which, when it is applied to a wristwatch, prevents the wristwatch from becoming too bulky due to its thickness, thereby enabling the wristwatch to give a comfortable feeling to the wrist, while overcoming the drawbacks possessed by conventional antenna devices.

DISCLOSURE OF THE INVENTION

The antenna device of the present invention is fabricated separately from a portable electronic appliance and assembled therein afterward. When this portable electronic appliance is a wristwatch, the antenna device is formed in a construction such that it can be installed on the side of the casing of the wristwatch conforming to the shape of the watch case.

The electronic appliances therefore do not become bulky, and thus there are no restrictions imposed on the design. When such an antenna is applied to a wristwatch, the wristwatch gives a comfortable feeling of wearing to the wrist.

In addition, the reception performance of the antenna of the present invention is promoted, because the antenna device of the present invention is enclosed in an antenna case either formed of or coated with a non-metallic material and installed apart from the watch case made of a metallic material.

Furthermore, because the antenna device of the present invention has a bent antenna, it has an excellent directivity and can receive radio waves from various directions. The reception performance is thus further promoted.

Still further, because the antenna case is fixed to the watch case with screws at positions apart from the extended line of the antenna core in the antenna device of the present invention, reception interference by metallic screws can be avoided, resulting in further promotion of the reception performance.

BRIEF DESCRIPTION OF THE DRAWINGS

FIG. (10A) shows an exploded view of an antenna core of an antenna in the antenna device of a third embodiment of the present invention.

BEST MODE FOR CARRYING OUT THE PRESENT INVENTIONS

The present invention will be now described in more detail with reference to the accompanying drawings, depicting embodiments in which the antenna of the present invention is applied to an electronic wristwatch.

Figure 1:
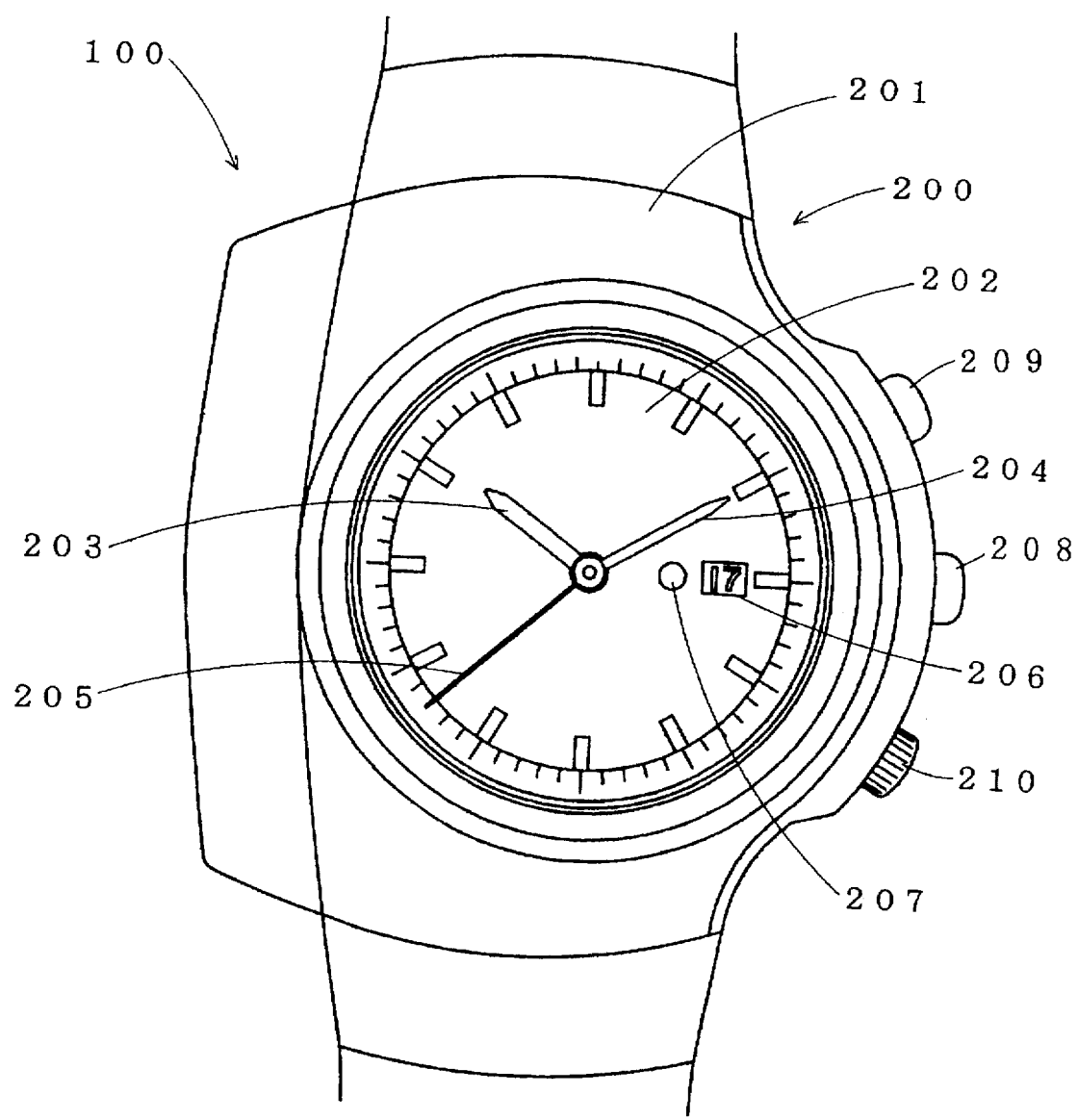
FIG. 1 is a plan view showing an external appearance of an electronic wristwatch to which the antenna device of the present invention is applied.

FIG. 1 shows an external appearance of an electronic wristwatch equipped with a preferred embodiment of the antenna device of the present invention. As shown in the Figure, the structure of this embodiment is composed of an antenna device 100 secured to a wristwatch 200 at the 9:00 o'clock side.

Illustrating first wristwatch 200, the wristwatch presented here possesses functions similar to an ordinary wristwatch, and various components of a watch, such as a dial 202, an hour hand 203, a minute hand 204, and a second hand 205, are enclosed and sealed in a watch case 201. On dial 202, a calendar display 206 and an AM/PM display unit 207, which displays different colors for AM and PM by a disc (not shown in the drawings) with two distinctly colored areas rotating under dial 202, are provided.

A first push-pull button 208, a second push-pull button 209, and a winding stem 210 are attached to the 3:00 o'clock side of the watch case 201. Here, the first push-pull button 208 is a time-correcting button, which may be used in countries where a summer-time system is adopted. Time correction of one hour can be performed by one-touch of this push-pull button. Second push-pull button 209 is an operating button for reception monitoring or for forced reception of radio waves.

Figure 2:
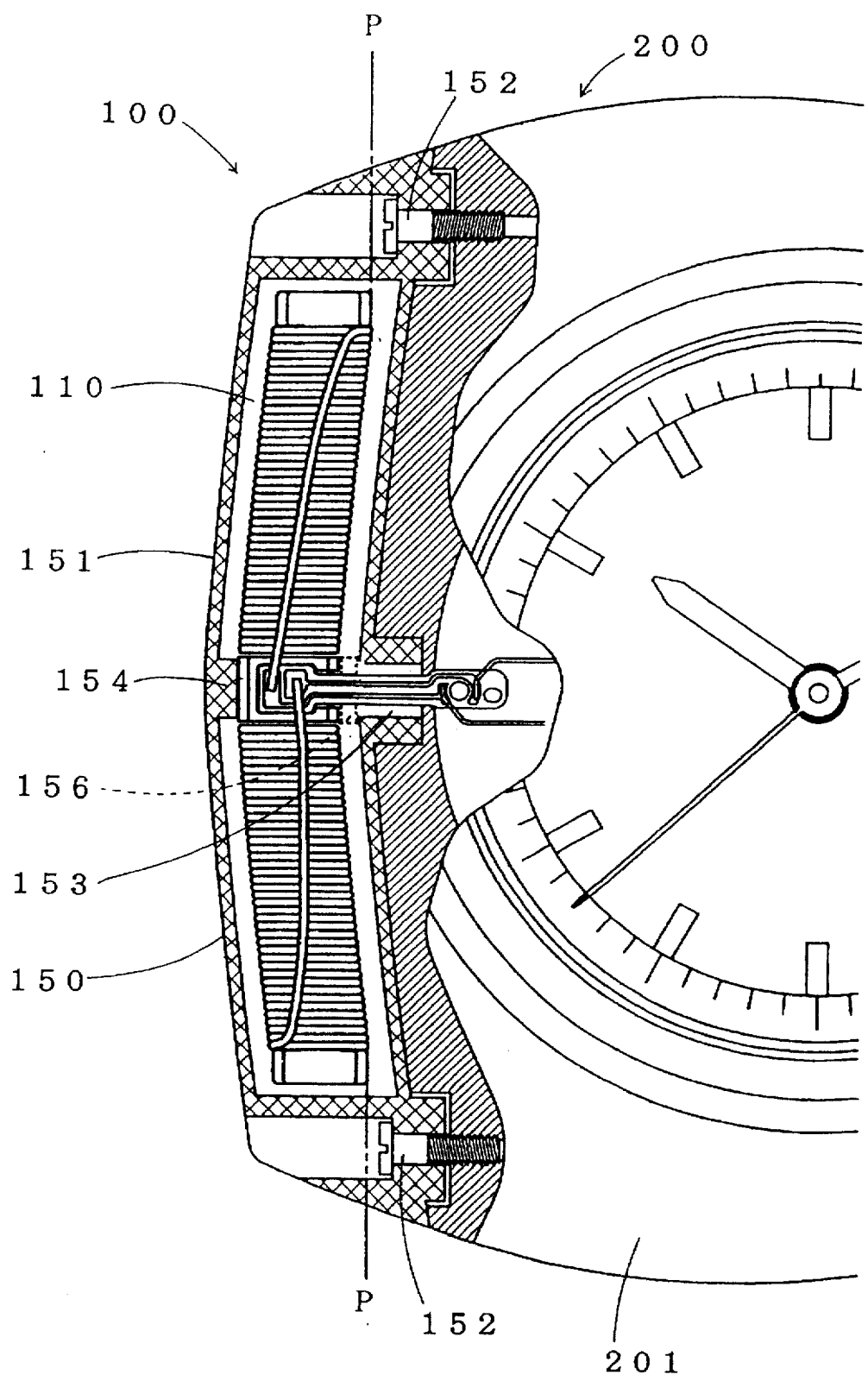
FIG. 2 is a cross-sectional plan view of the antenna device of the first embodiment.

Illustrating then antenna device 100, this antenna device 100 comprises, as shown in FIG. 2, an antenna 110 and an antenna case 150, in which the antenna 110 is enclosed and secured to the 9:00 o'clock side of the watch 200.

Figure 3A:
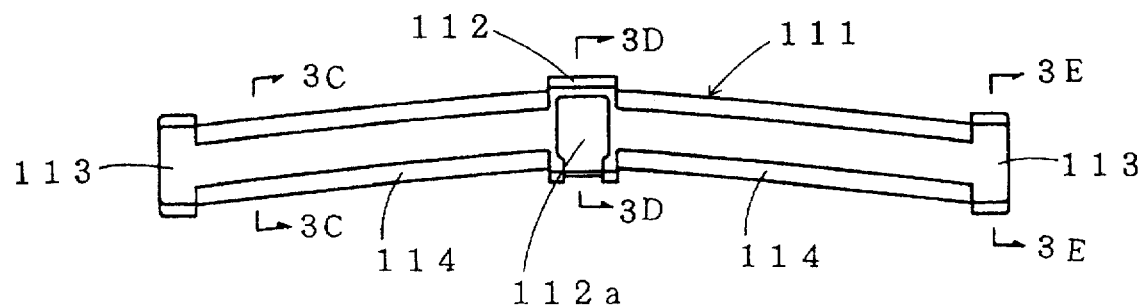
FIG. 3(A) shows a front view of the antenna core in the antenna device of the first embodiment.
Figure 3B:
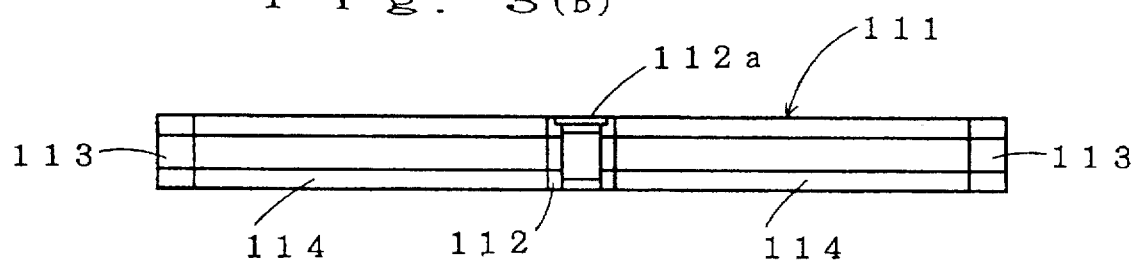
FIG. 3(B) is a bottom view.
Figure 3C:
FIG. 3(C) is a cross-sectional side view along a line a line 3(C)—3(C) in FIG. 3(A)
Figure 3E:
FIG. 3(E) is a cross-sectional side view along a line 3(E)—3(E) in FIG. 3(A)
Figure 3D:
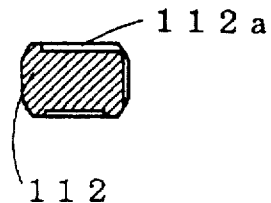
FIG. 3(D) is a cross-sectional side view along a line 3(D)—3(D) in FIG. 3(A)

FIG. 3(A) is the front view of the antenna core, and 3(B) is the bottom view. The antenna core 111 is slightly bent as shown in FIG. 3(A), so that the antenna core may conform to the outer curvature of the watch case 201 at its 9:00 o'clock side (the antenna case 150 is also bent as will be described later).

Antenna core 111 (also antenna case 150) can take any curved profile inasmuch as the curvature conforms to the shape of watch case 201 on the 9:00 o'clock side. Further, the shapes of antenna core 111 and antenna case 150 are not necessarily the same so long as antenna core 111 can be enclosed in antenna case 150.

The position for securing the antenna device is not necessarily limited to the 9:00 o'clock side. It can be secured on the 12:00 o'clock side or the 6:00 o'clock side.

When the antenna core 111 is bent in this manner, not only the directivity of the antenna is improved because the antenna can receive radio waves from various directions, but also a better watch design can be attained.

Antenna core 111 is formed integrally with a center frame 112, edge frames 113 at both ends of the core, and wound sections 114, 114, each being situated between the center frame 112 and the edge frame 113. A terminal sheet groove 112a is formed on the upper surface of the center frame 112.

The antenna core 111 is formed, as shown in FIGS. 3(B), 3(C), 3(D) and 3(E), such that at least one of the surfaces along the longitudinal direction (both the front and bottom faces in this embodiment) constitutes one continuous flat plane. This is primarily because antenna core 111 is made of a ferrite material and formed integrally with a spool consisting of the center frame 112 and edge frames 113.

Specifically, antenna core 111 made of ferrite is first molded by means of metal injection, followed by defatting and burning on a level block. In this defatting and burning operation the antenna core 111 is designed so that its whole plane is brought to come into contact with the level block, because if the spool consisting of center frame 112 and edge frames 113 are projected, the indented wound sections may hang down. This also makes contraction of antenna core 111 after burning uniform.

Figure 4:
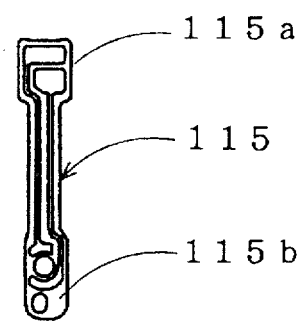
FIG. 4 is a front view of a terminal sheet in the antenna device of the first embodiment.

Terminal sheet 115 is formed rectangular, as shown in FIG. 4, with a wire joining section 115a at one end and a circuit joining section 115b at the other end. Since the outer shape of wire joining section 115a is made to coincide with the shape of terminal sheet groove 112a of antenna core 111, terminal sheet 115 is automatically positioned when wire joining section 115a is engaged with terminal sheet groove 112a. When the terminal sheet 115 is thus positioned, the circuit joining section 115b is also automatically positioned at the joining point with the circuit substrate of the timepiece module (see FIGS. 2 and 7).

Winding 116 is individually wound around wound sections 114, 114 of antenna core 111, and both ends of winding 116 are connected to wire joining section 115a of terminal sheet 115. Thus, the signal received by the antenna is transmitted to the timepiece circuit from the central part of antenna core 111 through terminal sheet 115.

Center frame 112 of antenna core 111 and edge frames 113 at both ends of antenna core 111 function collectively as a spool and prevent the winding 116 from being loosened.

In addition, edge frames 113 at both ends of antenna core 111 are placed on the same axial line in parallel facing each other. Owing to this arrangement, antenna core 111 can be rotated as being supported by both ends when winding 116 is wound around antenna core 111. In this manner, winding operation can be carried out in a stable manner.

Figure 5:
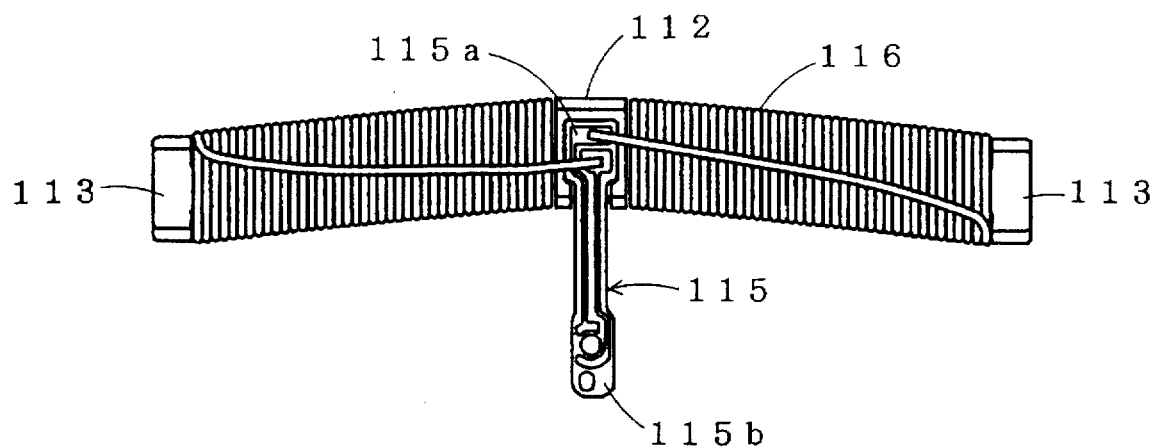
FIG. 5 is a front view of the antenna in the antenna device of the first embodiment.

Antenna 110 is constructed in this manner, and appears as shown in FIG. 5 when assembled. Since antenna core 111 is fragile, antenna 110 is housed in antenna case 150.

Figure 6:
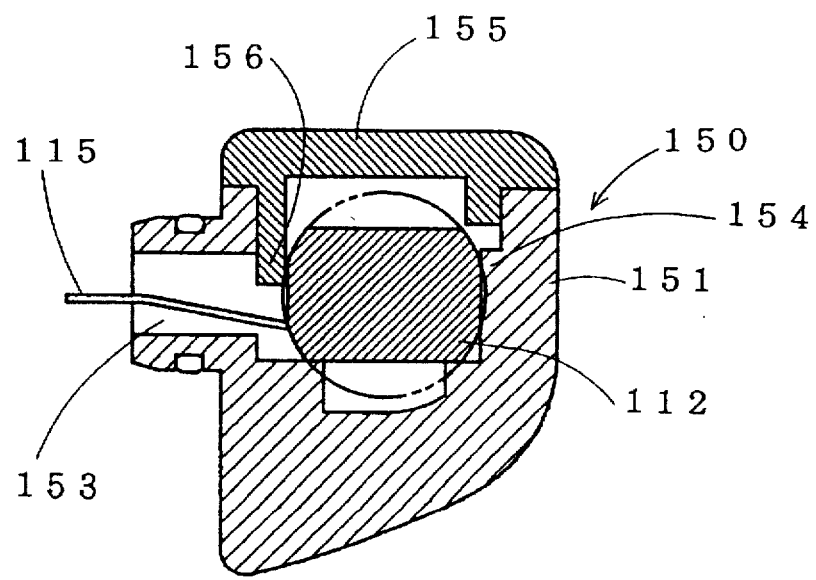
FIG. 6 is a cross-sectional view along the central part of the antenna case in the antenna device of the first embodiment.

This antenna case 150 consists of a case body 151 and a cap 155 as shown in FIG. 6, and made of a material which gives no interference with radio waves, such as non-metallic plastic, for promoting the reception performance.

The side of antenna case 150 where it keeps contact with wristwatch 200 has a shape corresponding to the shape at the 9:00 clock side of watch case 201, and as shown in FIG. 2, antenna case 150 is secured to watch case 201 by being fixed with screws 152 at both ends of the case body 151. When metallic screws are used as screws 152, they are positioned apart from the extended line of antenna core 111, as shown in FIG. 2, so that they do not interfere with the reception performance of antenna 110.

A connecting hole 153 is provided in the center of case body 151 at the watch case side as shown in FIGS. 2 and 6, and terminal sheet 115 is guided into the inside of the watch case 201 through this connecting hole 153.

Figure 7:
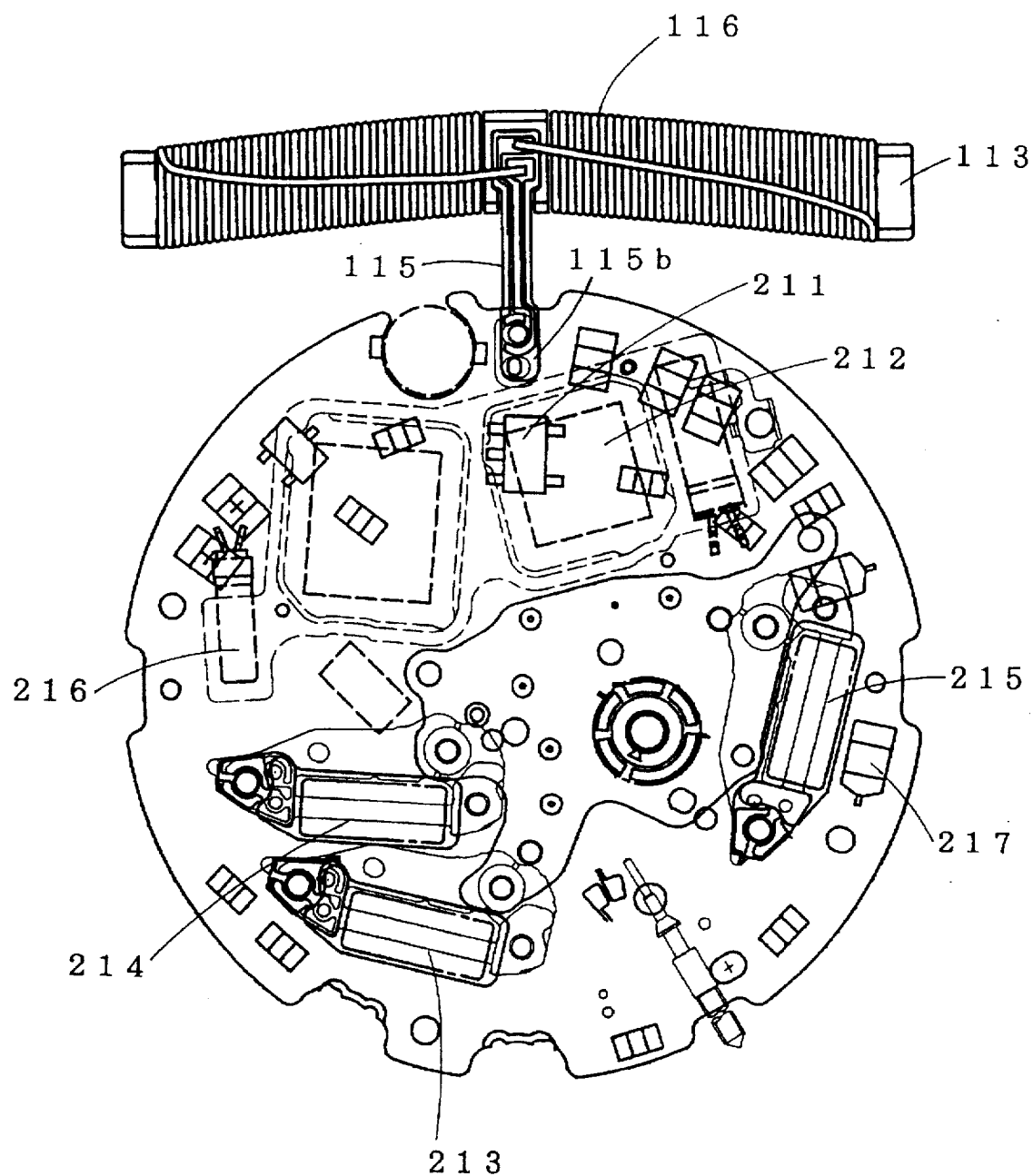
FIG. 7 is a plan view showing the relationship of the antenna and the circuit substrate in the timepiece module of the first embodiment.

In the electric circuit of wristwatch, to which circuit joining part 115b of terminal sheet 115 is connected, an amplifier 211, IC 212, and the like for processing signals from the antenna are provided adjacent to circuit joining part 115b as shown in FIG. 7. With this circuit arrangement, signals from the antenna can be processed before being affected by noises originating from motors 213–215, crystal oscillator 216, or condenser 217, and the like, thus preventing operational errors of the watch.

Further as shown in FIGS. 2 and 6, a stopper projection 154 is provided inside case body 151 at the position corresponding to center frame 112 of the antenna core, and another stopper projection 156 is also provided inside cap 155 at the position corresponding to center frame 112 of the antenna core. These projections 154 and 156 hold antenna 110 tightly between them and fix it so firmly that it does not move in antenna case 150. This prevents breakage of antenna core 111 and promotes stability of its reception performance.

The antenna device 100 thus constructed is positioned on the 9:00 o'clock side of watch case 201 and secured by screws 152, 152, as mentioned above.

Figure 8:
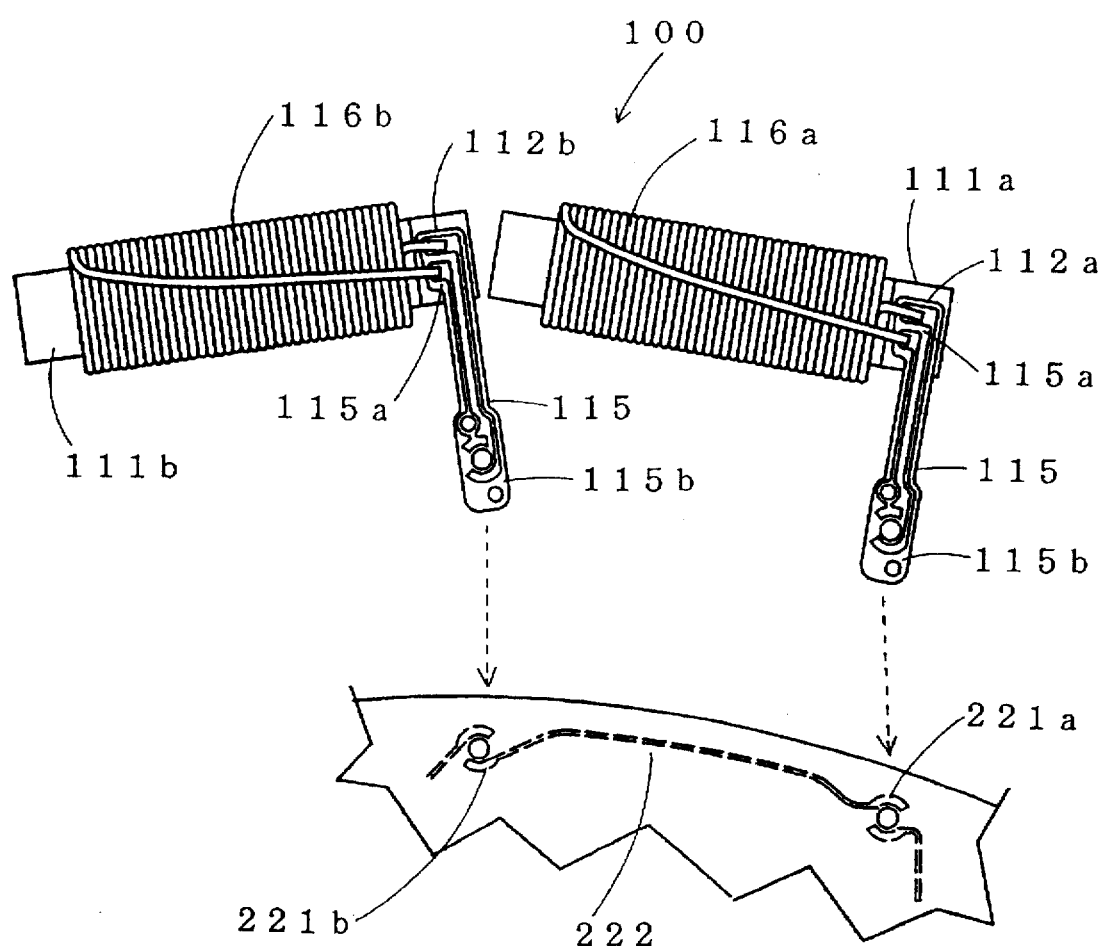
FIG. 8 is an exploded view showing the antenna device of a second embodiment.
Figure 9:
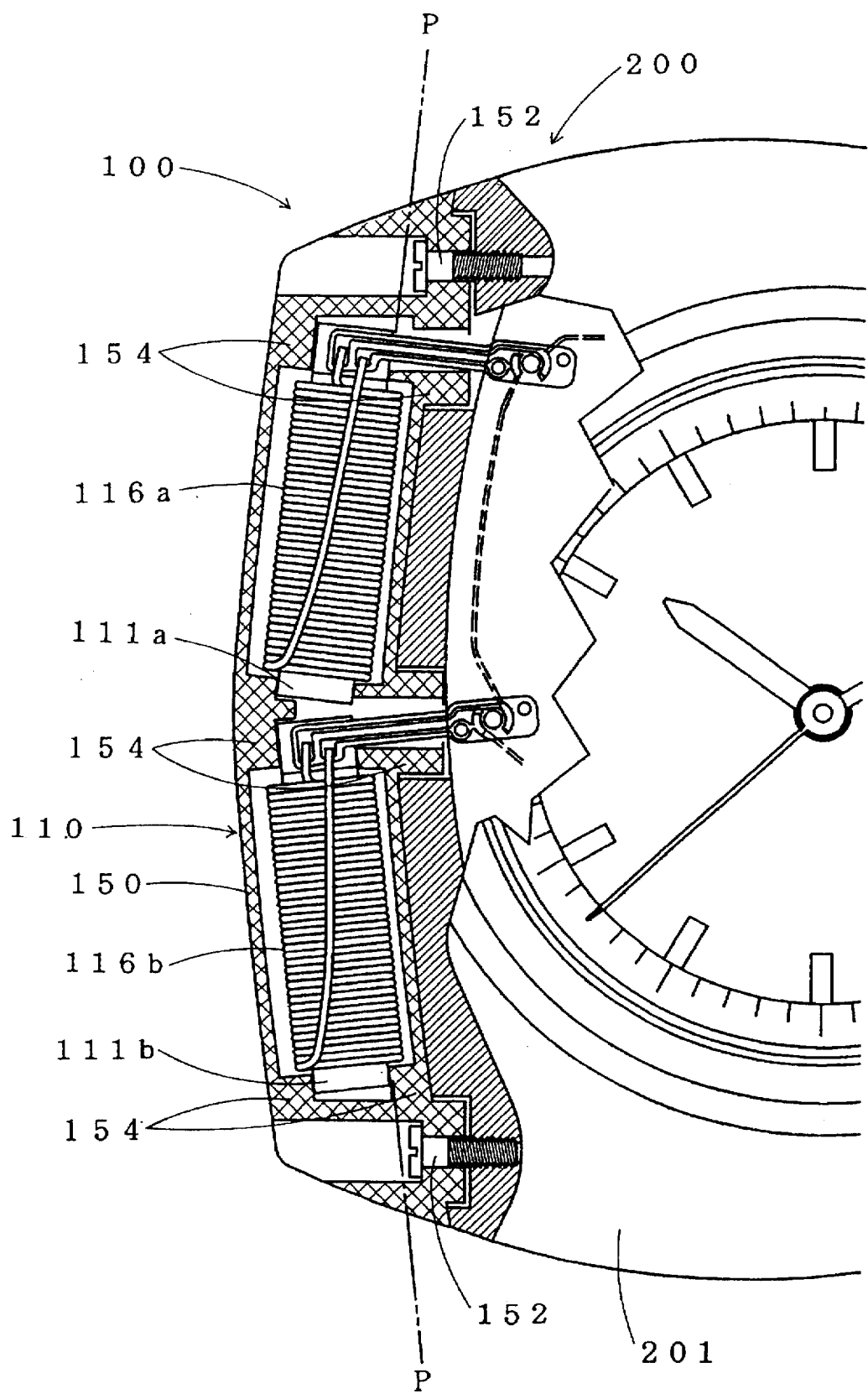
FIG. 9 is a cross-sectional plan view of the antenna device of the second preferred embodiment.

FIGS. 8 and 9 show a second preferred embodiment of the antenna device of the present invention.

In this embodiment, antenna core 111 (not shown) is formed from two separate core bodies 111a and 111b, and windings 116a and 116b are wound around each core body 111a and 111b. Terminal sheet grooves 112a and 112b are formed on one side of each core body 111a and 111b. These terminal sheet grooves 112a and 112b have the same shape as the wire joining part 115a of terminal sheet 115. Thus, when wire joining section 115a is engaged with terminal sheet grooves 112a and 112b, circuit joining parts 115b of terminal sheets 115 are automatically positioned at intended joining position on the circuit substrate of the timepiece module.

On the circuit substrate of the timepiece module, terminals 221a, 221b and a lead section 222 are provided for connecting the left end of winding 116a and the right end of winding 116b. Therefore, windings 116a and 116b are made integral when the circuit joining part of the terminal sheet connected to winding 116a and the circuit joining part of the terminal sheet connected to winding 116b are joined together. In this manner, the antenna core 111 consisting of core bodies 111a and 111b, and the windings 116a and 116b altogether form one antenna 110.

In this instance, core bodies 111a and 111b are positioned with a prescribed angle which corresponds to the shape of the side of watch case 201. Further, antenna 110 is housed in antenna case 150, and both ends of core bodies 111a and 111b are fixed by stopper projection 154 of case body 151.

Because the antenna device of this second embodiment has an antenna core 111 (111a, 111b) formed in a simple bar-shape, it can be easily manufactured. In addition, winding operation can be performed comparatively easily, if a wire such as Bondmet wire is used.

Figure 10A:
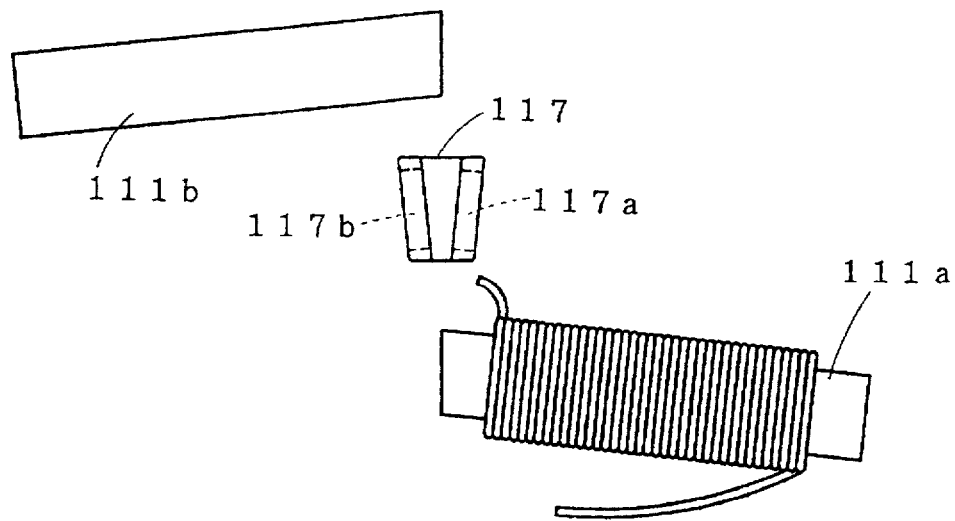
FIG. 10(B) is the antenna core as integrated.
FIG. 10(C) is the antenna as assembled.
Figure 10B:
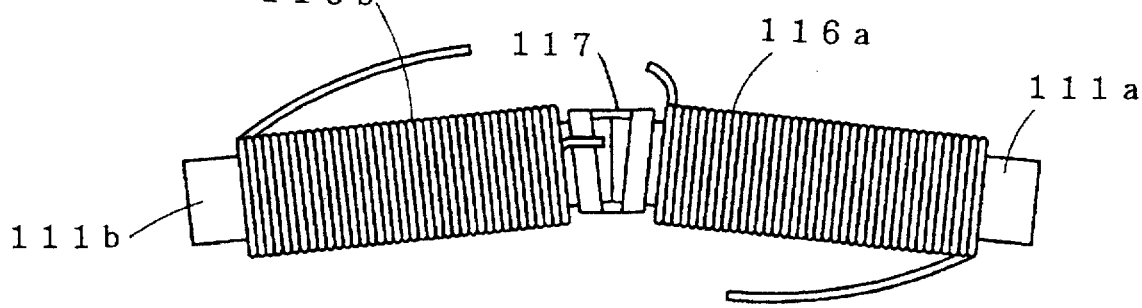
Figure 10C:
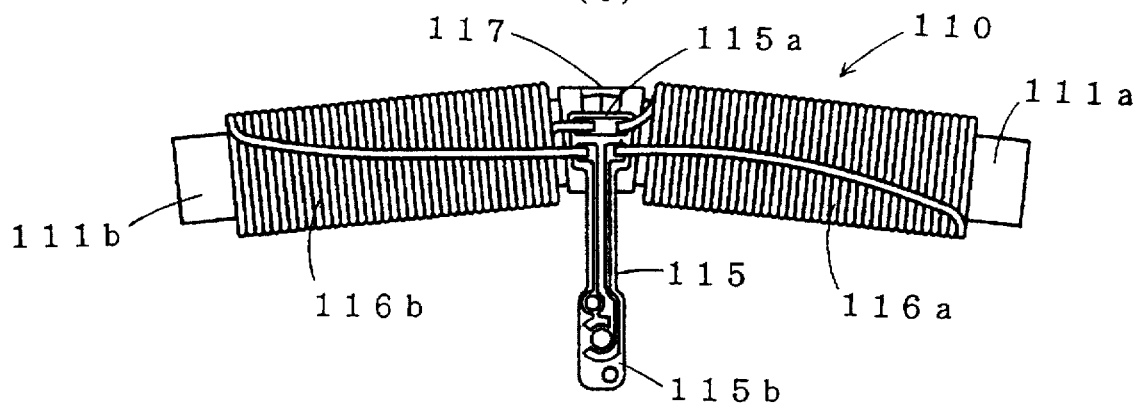

FIGS. 10 (A)–10(C) show a third preferred embodiment of the antenna device of the present invention.

Also in this embodiment, antenna core 111 (not shown) is formed from two separate core bodies 111a and 111b, around which windings 116a and 116b are respectively wound, as shown in FIG. 10(A). The opposing faces of core bodies 111a and 111b are shaped slant against the axial center of each core body.

Slanted sides of core bodies 111a and 111b, around which windings 116a and 116b are respectively wound, are pressed into ring sections 117a and 117b of a connecting bobbin 117, and firmly fixed with an adhesive. This enables the slanted ends of core bodies 111a and 111b to contact with each other in connecting bobbin 117, thereby bringing the two core bodies 111a and 111b to be integrated by connecting bobbin 117 to form antenna core 111.

In this case, the integrated antenna core 111 is bent at a prescribed angle corresponding to the side shape of watch case 201 on account of the slope of the slanted side faces of core bodies 111a and 111b.

Wire joining section 115a of terminal sheet 115 is fixed to connecting bobbin 117 with an adhesive. By fixing wire joining section 115a in this manner, circuit joining part 115b of terminal sheet 115 is positioned at the joining point of the circuit substrate in the timepiece module. The left end of winding 116a and the right end of winding 116b are joined at wire joining section 115a, and the right end of winding 116a and the left end of winding 116b are joined to the circuit substrate in the timepiece module via wire joining section 115a and circuit joining section 115b.

In this manner, windings 116a and 116b are also integrated to constitute antenna 110 together with antenna core 111 (111a and 111b) and terminal sheet 115.

Figure 11:
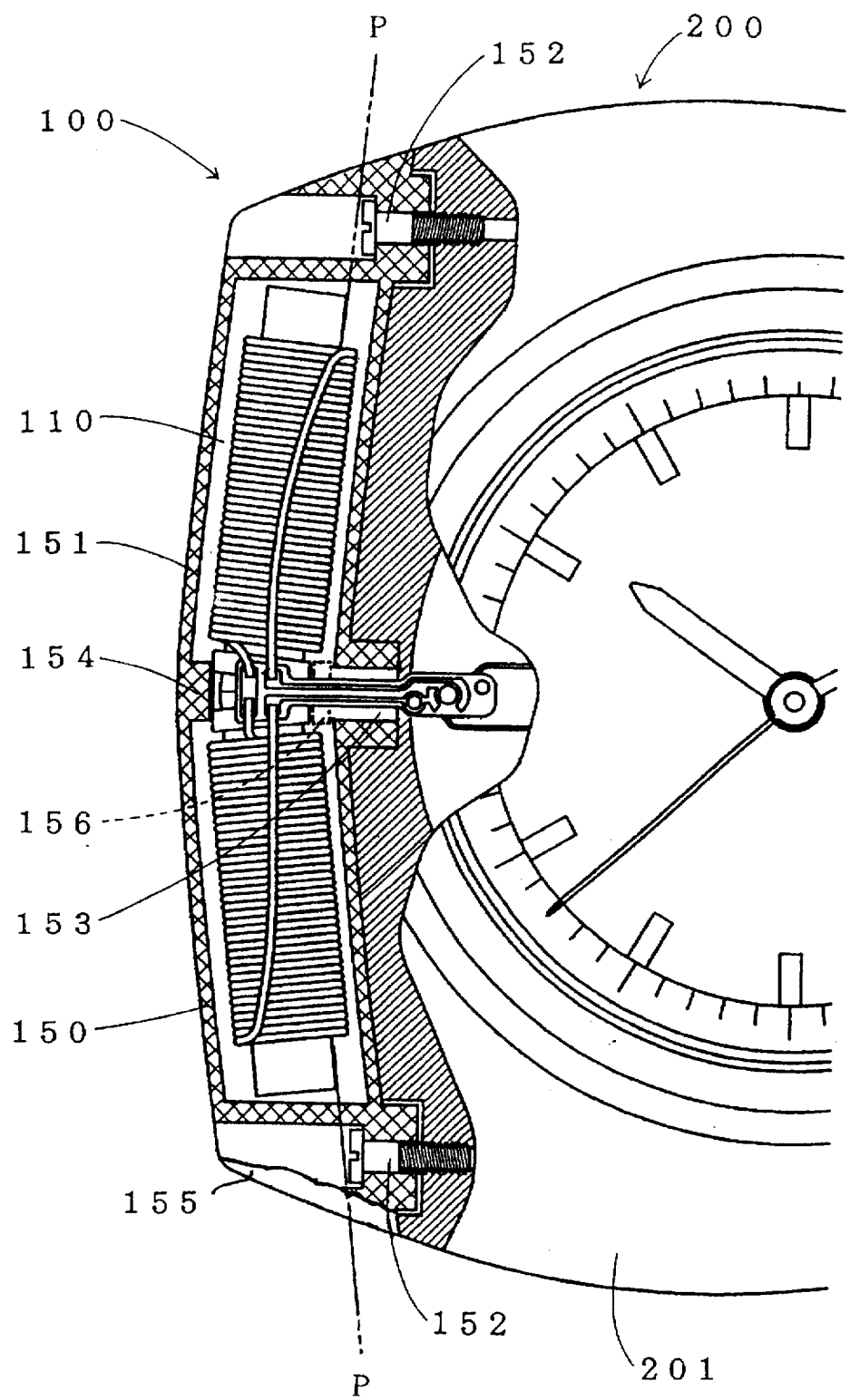
FIG. 11 is a cross-sectional view of the antenna device of the third embodiment of the present invention.

This antenna 110 is also housed within antenna case 150 as shown in FIG. 11, and the upper and bottom sections of connecting bobbin 117 are fixed firmly between stopper projection 154 of case body 151 and stopper projection 156 of cap 155, in the same manner as in the first embodiment.

The antenna device of the third embodiment is also formed from two separate core bodies, each consisting of a straight bar, around which windings are wound. Because of this, manufacture of the antenna core and winding work can be facilitated.

FIELD OF INDUSTRIAL APPLICATION

As illustrated above, the antenna device of the present invention for portable electronic appliances is suitable for use as an antenna device for electronic wristwatches for receiving standard radio waves, electronic wristwatches equipped with built-in radio, and the like, or as an antenna device for portable communication tools, portable TVs, and the like.

What is claimed is:

1. An antenna device for a portable electronic appliance with a curved side portion and an electric circuit therein, comprising, an antenna case formed separately from the electronic appliance and immovably fixed to the curved side portion of the electronic appliance, said antenna case being formed of a case body and a cap for covering the case body, said case body and cap being made of a non-metallic material and having curved shapes extending along the curved side portion of the electronic appliance, an antenna disposed inside the antenna case, said antenna having elongated core bodies disposed angularly with respect to each other to generally extend along the curved shapes of the case body and the cap, windings wound around the core bodies, and at least one joining member connected to the windings and the electric circuit of the electric appliance, and at least one stopper projection integrally formed with the case body at an inside thereof, said at least one stopper projection securely holding the antenna inside the antenna case.

2. The antenna device for a portable electronic appliance according to claim 1, wherein said portable electronic appliance is a wristwatch and said antenna device is installed on the 9:00 o'clock side of said wristwatch.

3. The antenna device for a portable electronic appliance according to claim 2, wherein said antenna device is bent conforming to the shape of the 9:00 o'clock side of a watch case of said wristwatch.

4. The antenna device for portable electronic appliances according to claim 3, wherein a center frame is integrally formed on the center of said core bodies, and a groove for positioning a terminal sheet which serves as said joining member is provided on one surface of said center frame.

5. The antenna device for a portable electronic appliance according to claim 4, wherein edge frames are integrally formed on each side of said core bodies.

6. The antenna device for a portable electronic appliance according to claim 5, wherein said edge frames are provided on the same line along the longitudinal direction of said core bodies in parallel facing each other.

7. The antenna device for a portable electronic appliance according to claim 6, wherein at least one of surfaces along the longitudinal direction of said core bodies formed integrally with said center frame and edge frames is made flat.

8. The antenna device for a portable electronic appliance according to claim 2, wherein said core bodies are joined by a bobbin with an angle corresponding to a shape of the 9:00 o'clock side of a watch case of the wristwatch.

9. The antenna device for a portable electronic appliance according to claim 8, wherein said bobbin is connected to the at least one joining member.

10. The antenna device for a portable electronic appliance according to claim 2, wherein said antenna case is fixed to the watch case with screws at positions apart from an extended line of the core bodies.

11. The antenna device for a portable electronic appliance according to claim 1, wherein said core bodies are connected together along a longitudinal direction thereof and the at least one joining member is connected to a middle portion of the core bodies, said cap having an additional stopper projection contacting the core bodies for securely holding the antenna together with the at least one stopper projection.

12. The antenna device for a portable electronic appliance according to claim 11, wherein said core bodies are two and are bent at a portion for connecting the two core bodies, each core body extending linearly, said case body and cad being integrally connected to the electronic appliance as one unit.

13. The antenna device for a portable electronic appliance according to claim 12, wherein said core bodies have edge frames at both longitudinal ends thereof, said edge frames and the at least one joining member extending parallel to each other.

14. The antenna device for a portable electronic appliance according to claim 1, wherein said core bodies are two, each core body being connected to one joining member at one side thereof.

* * * * *